United States Patent
Williams et al.

(10) Patent No.: US 10,336,238 B2
(45) Date of Patent: Jul. 2, 2019

(54) TRUCK BED REAR CARGO TIE DOWN ENGAGEMENT STRUCTURE

(71) Applicant: Toyota Motor Engineering & Manufacturing North America, Inc., Erlanger, KY (US)

(72) Inventors: Paxton S. Williams, Milan, MI (US); Scott L. Frederick, Brighton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 15/724,641

(22) Filed: Oct. 4, 2017

(65) Prior Publication Data
US 2019/0100128 A1    Apr. 4, 2019

(51) Int. Cl.
*B60P 7/08* (2006.01)
*B62D 33/03* (2006.01)
*B62D 33/027* (2006.01)

(52) U.S. Cl.
CPC ........... *B60P 7/0815* (2013.01); *B60P 7/0823* (2013.01); *B62D 33/0273* (2013.01); *B62D 33/03* (2013.01)

(58) Field of Classification Search
CPC .. B60P 7/0815; B60P 7/0823; B62D 33/0273; B62D 33/03
USPC ......... 410/8–12, 96–98, 100, 102, 104, 106, 410/110, 116; 24/115 K, 265 CD; 296/57.1; 224/403, 404, 517, 556, 557; 248/499
See application file for complete search history.

(56) References Cited

U.S. PATENT DOCUMENTS

| | | | | |
|---|---|---|---|---|
| 3,011,818 A | * | 12/1961 | Matthiessen | E05C 17/36 248/499 |
| 4,108,342 A | * | 8/1978 | Riva | B60P 7/0807 248/499 |
| 4,248,558 A | * | 2/1981 | Lechner | B60P 7/0815 410/104 |
| 4,779,779 A | * | 10/1988 | Haugland | B60R 9/065 410/97 |
| 5,011,349 A | | 4/1991 | McAndrews | |
| 5,378,094 A | * | 1/1995 | Martin | B60P 7/0807 410/101 |
| 5,533,848 A | * | 7/1996 | Davis | B60P 7/0815 410/104 |
| 6,783,312 B2 | | 8/2004 | Smith | |
| 6,799,927 B2 | | 10/2004 | Wheatley | |
| 7,350,843 B2 | * | 4/2008 | Meyers | B60P 1/43 14/69.5 |
| 7,874,774 B2 | * | 1/2011 | Peterson | B60P 7/0815 410/104 |

(Continued)

*Primary Examiner* — Stephen T Gordon
(74) *Attorney, Agent, or Firm* — Christopher G. Darrow; Darrow Mustafa PC (57) ABSTRACT

A load securement apparatus for a vehicle incorporating a cargo bed and a tailgate movable between a raised configuration and a lowered configuration to open and close the cargo bed. The load securement apparatus includes at least one tie-down engagement structure connected to another portion of the vehicle in a position located such that a tie-down member is engaged with the tie-down engagement structure by extending a portion of the tie-down member into a gap formed between an end of the cargo bed and the tailgate when the tailgate is in the lowered configuration.

6 Claims, 6 Drawing Sheets

(56) References Cited

U.S. PATENT DOCUMENTS

2002/0048495 A1* 4/2002 Anderson ............ B60P 7/0815
                                                                          410/104
2014/0271021 A1* 9/2014 Cardona ................ F16B 7/187
                                                                          410/104

* cited by examiner

TRUCK BED REAR CARGO TIE DOWN ENGAGEMENT STRUCTURE

TECHNICAL FIELD

The present invention relates to structures which portions of a tie-down member can engage or attach to, to aid in securing a load in a cargo bed of a vehicle, such as a pickup truck.

BACKGROUND

Users of vehicles (such as pickup trucks) capable of hauling cargo may need to transport long boards or other items which may be too long to fit inside a cargo bed with the tailgate closed. Many pickup trucks are designed so that an inner wall of the tailgate lies level with the floor of the cargo bed when the tailgate is lowered. Thus, to accommodate longer loads, the tailgate may be lowered to extend the effective length of the cargo bed. However, with the tailgate lowered, it may be difficult to secure such longer loads to the vehicle so that the load does not shift or slide out of the cargo bed during transport.

SUMMARY

In one aspect of the embodiments described herein, a load securement apparatus for a vehicle incorporating a cargo bed and a tailgate movable between a raised configuration and a lowered configuration to open and close the cargo bed is provided. The load securement apparatus includes at least one tie-down engagement structure connected to another portion of the vehicle in a position located such that a tie-down member is engaged with the tie-down engagement structure by extending a portion of the tie-down member into a gap formed between an end of the cargo bed and the tailgate when the tailgate is in the lowered configuration.

In another aspect of the embodiments described herein, a load securement apparatus for a vehicle incorporating a cargo bed and a tailgate movable between a raised configuration and a lowered configuration to open and close the cargo bed is provided. The load securement apparatus includes at least one tie-down engagement structure connected to another portion of the vehicle. The at least one tie-down engagement structure is positioned and structured to be engageable by a tie-down member at a location directly opposite the tailgate when the tailgate is in a lowered configuration.

In another aspect of the embodiments described herein, a load securement apparatus for a vehicle incorporating a cargo bed and a tailgate movable between a raised configuration and a lowered configuration to open and close the cargo bed is provided. The load securement apparatus includes at least one tie-down engagement structure connected to another portion of the vehicle. The at least one tie-down engagement structure is positioned and structured to be engageable by a tie-down member at a location below a gap formed between the tailgate and a rear-most portion of a cargo bed of the vehicle when the tailgate is in a lowered configuration.

DETAILED DESCRIPTION

Embodiments described herein relate to a load securement apparatus for a vehicle incorporating a cargo bed and a tailgate movable between a raised configuration and a lowered configuration to open and close the cargo bed. The load securement apparatus includes at least one tie-down engagement structure connected to another portion of the vehicle in a position located such that a tie-down member is engaged with the tie-down engagement structure by extending a portion of the tie-down member into a gap formed between an end of the cargo bed and the tailgate when the tailgate is in the lowered configuration. The tie-down member may engage the tie-down engagement structure at a location within the gap or at a location below the gap, depending on the space available within the gap, the configuration of the tie-down engagement structure, and other pertinent factors. Securing a load to the vehicle using a tie-down member with ends extending into the gap enables a strong downwardly-acting retention force to be applied to an extended-length load, to secure the load to the floor of the cargo bed and to the inner surface or wall of a lowered tailgate.

As described herein, components "connected" to each other may be directly connected (by direct physical contact) or indirectly connected (i.e., through an intermediate part, for example in the case of a tie-down engagement structure 130 attached to another portion 32 of a vehicle 12 by a rail structure 50 as shown in FIGS. 4A-4D.

Figure 1A:
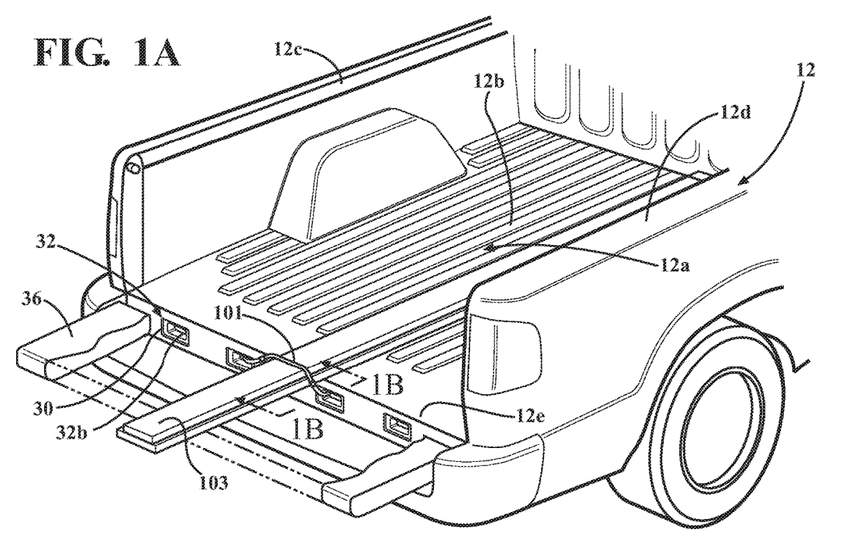
FIG. 1A is a schematic perspective view of rear portion of a pickup truck incorporating an embodiment of the load securement apparatus, showing a portion of the tailgate of the pickup truck removed for purposes of description.
Figure 1B:
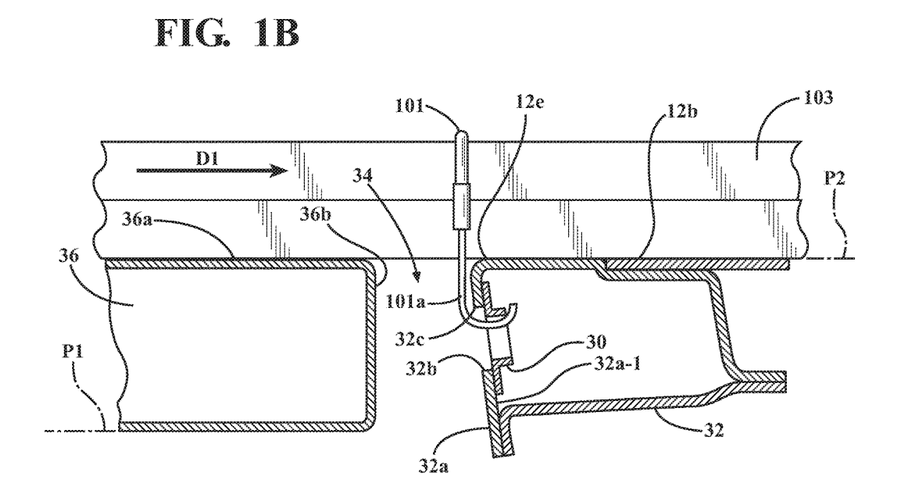
FIG. 1B is a schematic partial cross-sectional view of a portion of the pickup truck of FIG. 1A, showing a gap formed between a rear-most end of the cargo bed and a tailgate when the tailgate is in a lowered configuration, and showing engagement of a tie-down member inserted into the gap with a tie-down engagement structure at a location directly opposite the tailgate when the tailgate is in the lowered configuration.
Figure 1C:
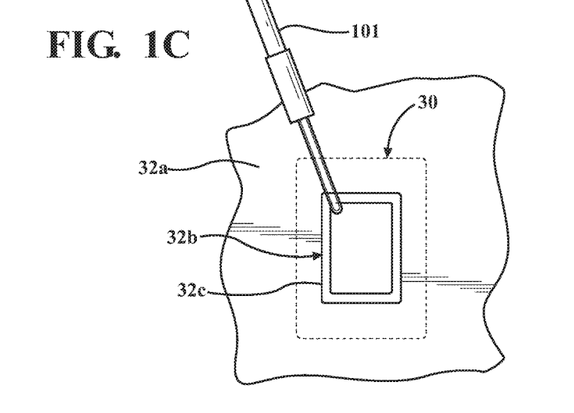
FIG. 1C is a frontal view of the tie-down engagement structure shown in FIGS. 1A and 1B, as mounted in a wall of a portion of the pickup truck residing opposite the tailgate.

FIGS. 1A-1C show various views of a load securement apparatus for a vehicle 12 in accordance with an embodiment described herein. Although the embodiments of the load securement apparatus described herein are shown incorporated into a vehicle in the form of a pickup truck, it will be understood that an embodiment of the load securement apparatus may be incorporated into other types of load-carrying vehicles having pertinent features similar to the features of a pickup truck.

FIG. 1A is a schematic perspective view of rear portion of a pickup truck 12 incorporating an embodiment of the load securement apparatus, showing the tailgate of the pickup truck removed for purposes of description. Pickup truck 12 has a cargo bed 12a including a cargo bed floor 12b and left and right sidewalls 12c, 12d extending upwardly from opposite sides of the cargo bed floor 12b along right and left sides of the pickup truck 12.

In the embodiment shown in FIGS. 1A-1C, the load securement apparatus includes at least one tie-down engagement structure (generally designated 30) structured to enable engagement of a tie-down member therewith. The tie-down engagement structure 30 may be connected to another portion 32 of the pickup 12 truck which resides underneath or below a level of the cargo bed floor 12b. For example, as seen in the drawings, the other portion 32 of the pickup truck 12 to which the tie-down engagement structure 30 is connected may be an element of the vehicle frame or another structural member located under the cargo bed floor 12b of the cargo bed or otherwise below the level of the rear-most portion of the cargo bed floor 12b of the cargo bed 12a. The particular element of the vehicle residing in this location may depend on the design of the vehicle.

In addition, in many pickup trucks, a gap 34 exists between the tailgate 36 on one side and a rear-most end 12e of the cargo bed floor 12b on an opposite side when the tailgate 36 is in a lowered configuration as shown in FIGS. 1B and 1C. Depending on the particular vehicle design, the other portion 32 of the vehicle 12 underneath the cargo bed floor 12b may also reside in the gap opposite the tailgate when the tailgate 36 is in a lowered configuration.

In the embodiments shown in the drawings, this gap 34 may extend vertically between a first horizontal plane P1 extending through the lowest portion of the tailgate 36 closest to the rear wall 32a of the other portion 32 of the vehicle when the tailgate 36 is in the lowered configuration, and a second horizontal plane P2 passing through the rearmost end 12b-1 of the cargo bed floor 12b. For most pickup truck cargo beds and tailgates, the cargo bed floor 12b and the inner surface 36a of the tailgate 36 are designed to be coplanar or substantially coplanar when the tailgate 36 is in a lowered configuration, so that the tailgate inner surface 36a can serve as an extension of the cargo bed, if desired. In such cases, the inner surface 36a of the tailgate 36 will be coplanar with (or substantially coplanar with) the rearmost end 12b-1 of the cargo bed floor 12b, and will therefore also lie along plane P2. The gap 34 may extend horizontally within the horizontal planes described above and between an end 36b of the tailgate residing directly opposite the other portion 32 of the vehicle 12 and/or the rearmost end 12b-1 of the cargo bed floor 12b on one side, and the cargo bed floor 12b and the other portion 32 of the vehicle 12 residing under the cargo bed floor 12b on the other side.

In addition, in one or more arrangements described herein, the tie-down engagement structure 30 may be connected to the other portion 32 of the pickup truck 12 in a position located such that, in order for a tie-down member (such as tie-down member 101 in FIG. 1A) to engage the tie-down engagement structure 30, a portion of the tie-down member 101 is extended from above the gap 34 into the gap 34 formed between the rear-most end 12e of the cargo bed 12a and the tailgate 36 when the tailgate 36 is in the lowered configuration.

Figure 2:
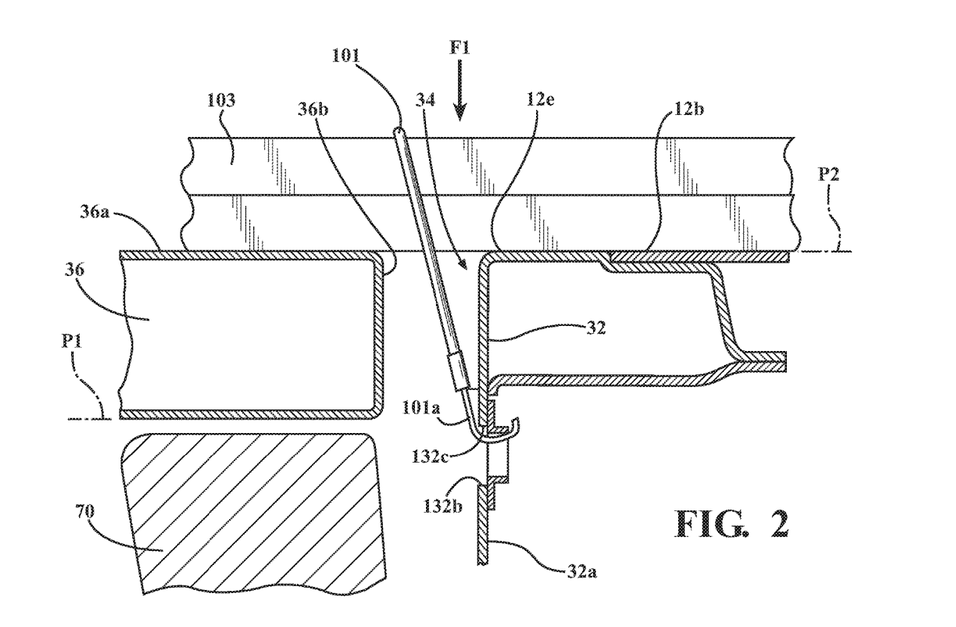
FIG. 2 is a schematic partial cross-sectional view of a portion of another embodiment of the pickup truck, showing a gap formed between a rear-most end of the cargo bed and a tailgate when the tailgate is in a lowered configuration, and showing engagement of a tie-down member with a tie-down engagement structure at a location below the gap.

In embodiments where the tie-down member extends into the gap and engages a tie-down engagement structure at a location directly opposite the tailgate when the tailgate is in a lowered configuration, the tie-down member may be considered to engage the tie-down engagement structure inside the gap. Also, in one or more arrangements, the tie-down member may extend into the gap and through the bottom of the gap to engage a tie-down engagement structure at a location below the gap, as shown in FIGS. 2, 4B, and 5.

In addition, in one or more arrangements, the tie-down engagement structure 30 may be statically connected or affixed to the other portion 32 of the vehicle 12, so as to be non-movable with respect to the remainder of the vehicle.

In the embodiment shown in FIGS. 1A-1C, the other portion 32 of the vehicle includes a wall 32a. The wall 32a may have an edge formed therealong. The tie-down engagement structure 30 may be secured to the wall 32a and extend along the edge of the wall 32a so as to reinforce the wall 32a.

In the particular embodiment shown in FIGS. 1A-1C, at least one opening 32b is formed in the wall 32a. Although the opening 32b is shown in the form of a hole enclosed by the material of the wall 32a on all sides, the opening 32b may have any of a variety of alternative forms, for example, an open slot extending into the wall from an edge of the wall 32a. In addition, edge of the wall 32a along which the tie-down engagement structure 30 extends may be an edge 32c of the opening 32b. The tie-down engagement structure 30 may be affixed to the wall 32a along the edge 32c of the opening 32b, by welding, adhesive attachment, or using any other suitable method. The tie-down engagement structure 30 may be attached to the wall 32a along the opening 32b so as to reinforce the wall 32a along the edge 32c of the wall 32a defined by the opening 32b. When attached to the wall 32a along the edge 32c of the opening 32b, the tie-down engagement structure 30 may be positioned for engagement by a tie-down member inserted into the opening as shown in FIGS. 1A and 1B. The pickup truck embodiment shown in FIG. 1A includes a plurality of openings 32b formed in wall 32a, with each opening 32b having an associated tie-down engagement structure 30 attached therealong, as previously described.

When affixed to the wall 32a of the other portion 32 of the vehicle 12, tie-down engagement structure 30 may provide a structure which may be engaged by a portion of the tie-down member 101, to secure the portion of the tie-down member 101 to the vehicle. The tie-down engagement structure 30 may also aid in distributing the loads exerted by the tie-down member 101 on the other portion 32 of the vehicle to which the tie-down engagement structure is secured (for example, wall 32b as shown in FIGS. 1A and 1B). This may aid in preventing damage to the portion 32 of the vehicle 12 to which the tie-down engagement structure is secured, and which may otherwise be engaged by the tie-down member. "Engagement" between a tie-down member and a tie-down engagement structure may be understood to mean contact between the tie-down member and the tie-down engagement structure sufficient to secure a portion of the tie-down member to the tie-down engagement structure until removed or "disengaged" by a user.

The tie-down engagement structure 30 is structured to be engageable by a tie-down member (such as tie-down member 101) in a known manner (using, for example, hooks, clasps, or other mechanisms), to establish contact between the tie-down member 101 and the tie-down engagement structure 30 and maintain the contact until the tie-down member 101 is disengaged from the tie-down engagement structure 30 by a user. In the embodiment shown in FIGS. 1A-1C, tie-down engagement structure 30 may have the form shown in FIG. 1C. The tie-down engagement structure 30 may be a rigid structure formed from a metallic, polymeric, or other suitable material, and may be configured to follow or extend along the edge of the opening 32b as shown when the tie-down engagement structure 30 is attached to the wall 32a along the opening 32b, thereby supporting the wall 32a along the opening 32b, providing an engagement surface for contact with a portion of a tie-down member 101 inserted into the opening 32b, and distributing the loads applied to the wall 32a via the tie-down member 101 due to shifting of the cargo loads secured by the tie-down member. In addition, in the embodiment shown in FIGS. 1A-1C, the wall 32a includes a first side 32a-1 structured to face in a first direction D1 toward a front of the vehicle, and the tie-down engagement structure 30 is affixed to the wall 32a along the first side 32a-1.

The tie-down member 101 may have any form suitable for attachment to the pickup truck 12 and securement of a load as described herein. For example, the tie-down member 101 may be an elastic bungee cord with hooks attached to the ends (as shown in FIGS. 1A-1C), or a canvas or woven strap having hooks or clips attached to ends thereof. The tie-down member 101 may also be in the form of a known two-piece ratcheting-type strap (not shown), with each strap having an end attachable to one or more tie-down engagement structures as described herein (using hooks, for example). One of the strap pieces may have a free end, and the other of the strap pieces may include a buckle mechanism incorporating a ratchet to enable the free end of the other strap piece to be gripped and tightened to aid in securing loads of varying sizes.

Engagement of a portion of the tie-down member 101 with the tie-down engagement structure 30 acts to secure the engaged portion of the tie-down member 101 to the vehicle 12, thereby helping to secure a load positioned in the cargo bed 12a as described herein. Engagement of a portion of a tie-down member 101 with a tie-down engagement structure 30 may be implemented using any method suitable for maintaining the a tie-down member 101 in contact with the tie-down engagement structure 30 until the portion of a tie-down member 101 is separated from the tie-down engagement structure 30 by a user. In one or more arrangements, the tie-down member 101 is engaged with the tie-down engagement structure (such as tie-down engagement structure 30) using a hook (such as hook 101a shown in FIG. 1B) formed or attached at an end of the tie-down member 101. The hook 101a may wrap around an edge, loop, or other suitable feature of the tie-down engagement structure so that contact is established between the hook and tie-down engagement structure and maintained until the hook is detached or removed.

FIGS. 1A-1C show a tie-down member 101 engaging separate tie-down engagement structures in spaced apart openings 32b formed in wall 32a, to secure a load of extended length lumber. Alternatively, a tie-down member may be wrapped over a load and ends of the tie-down member inserted into the gap so that both ends of the tie-down member engage the same tie-down engagement structure.

Referring to FIGS. 1A-1C, an embodiment of the tie-down engagement structure described herein may be used to secure cargo bed loads which extend past a rear-most end 12e of the cargo bed floor 12b and onto the inner surface 36a of the tailgate 36 when the tailgate is in a lowered configuration. For example, FIGS. 1A-1B show long pieces of lumber 103 secured in the cargo bed. The lumber pieces 103 are too long to rest on the cargo bed floor 12b of the cargo bed when the tailgate 36 is in a raised configuration. In order to attach the tie-down member to the tie-down engagement structure, at least a portion of the tie-down member extends into the gap 34 between the tailgate and the rear of the cargo bed. This arrangement enables a downwardly-acting securement force to be exerted on the extended load by the tie-down member when the tie-down member is attached to the tie-down engagement structure(s). For example, as shown in FIG. 2A, the tie-down member 101 exerts a downwardly-acting securement force in direction F1 on lumber pieces 103 when hook 101a of the tie-down member 101 are engaged with one or more tie-down engagement structures 30. This downwardly-acting securement force forces the load into intimate contact with the cargo bed floor 12b and the inner surface 36a of the tailgate 36, thereby securing the load to the cargo bed floor 12b and the inner surface 36a of the tailgate 36.

To engage the tie-down member 101 with a tie-down engagement structure 30, a user may position a load at a desired location on the cargo bed floor 12b/tailgate inner wall 36a as shown in the drawings. The user may then insert a hook 101a of an end of the tie-down member 101 into the gap 34 and engage the end of the hook with a tie-down engagement structure 30, at a location either in gap 34 or below the gap. Tension in the tie-down member 101 to apply the downward securement force may be applied by stretching of the tie-down member 101 (in the case of an elastic member) or by tensioning the tie-down member 101 in a known manner. When the opposite ends of the tie-down member 101 have been engaged with one or more associated tie-down engagement structures 30, the tension in the tie-down engagement structure 30 exerting the downward force will be applied in a known manner dependent upon the particular structure of the tie-down member.

Referring to FIG. 2, in one or more alternative arrangements, the edge 132c of the opening 132b formed in the other portion 32 of the vehicle resides below the gap 34. In addition, the tie-down engagement structure 30 structured to be engaged by a tie-down member is secured to the wall so as to extend along the edge 132c of the wall 32a residing below the gap 34. Thus, the engagement between the tie-down member 101 and the tie-down engagement structure 30 occurs below the gap 34.

In one or more embodiments described herein where engagement between a tie-down member and a tie-down engagement structure occurs below the gap 34, the engagement may occur between the other portion 32 of the vehicle and a rear bumper 70 of the vehicle, for example in cases where the rear bumper 70 is spaced apart from the other portion 32 of the vehicle.

As previously described, opposite ends of the tie-down member 101 may both extend into gap 34 and engage a single tie-down engagement structure 30, or (as shown in FIG. 1A) opposite ends of the tie-down member 101 may both extend into gap 34 and engage separate tie-down engagement structures 30 positioned along the other portion 32 of the vehicle 12. In addition, the ends of a tie-down member may both extend into gap 34 and engage one or more tie-down engagement structures 30 at locations residing within the gap 34 (as shown in FIGS. 1B and 3A), or the ends of a tie-down member may both extend into the gap 34 and engage one or more tie-down engagement structures 30 at locations residing below the gap 34 (as shown in FIGS. 2A and 5).

Figure 3A:
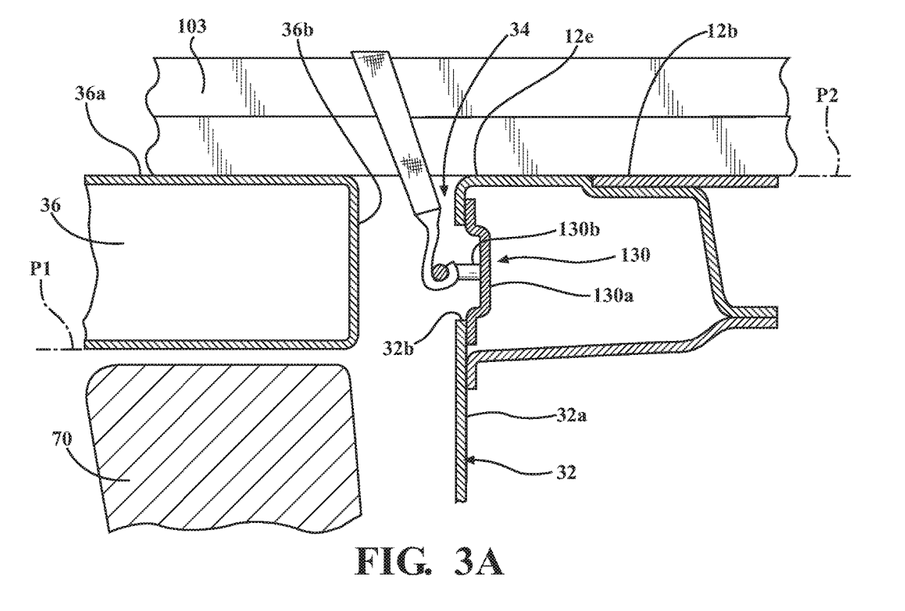
FIG. 3A is a schematic partial cross-sectional view of a portion of the pickup truck of FIG. 1A, showing a gap formed between a rear-most end of the cargo bed and a tailgate when the tailgate is in a lowered configuration, including a tie-down engagement structure in accordance with another embodiment described herein, and showing engagement of a tie-down member inserted into the gap with the tie-down engagement structure at a location directly opposite the tailgate when the tailgate is in the lowered configuration.
Figure 3B:
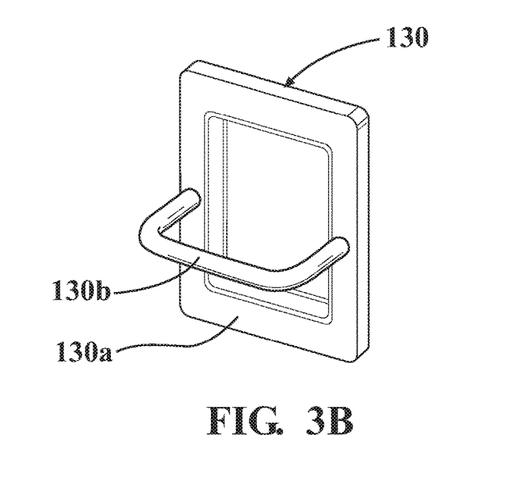
FIG. 3B is a frontal view of the tie-down engagement structure shown in FIG. 3A.

FIGS. 3A and 3B show an alternative form 130 of the tie-down engagement structure. Tie-down engagement structure 130 includes a planar base portion 130a similar in structure to the tie-down engagement structure 30 previously described, and configured for extending along an edge or opening formed in the wall 32a of the other portion 32 of the vehicle 12 to strengthen the wall. In addition, tie-down engagement structure 130 also has a loop 130b extending from the base portion 130a. Each end of the loop 130b is attached to the base portion. The loop 130b is structured so as to project out of a plane of the base portion 130a as shown in FIGS. 3A and 3B, to facilitate attachment or engagement of a portion of a tie-down member to the loop after the portion of the tie-down member is inserted into the gap 34. Although the loop 130b shown in the drawings is generally rectangular, the loop 130b may have any shape suitable for the purposes described herein. In addition, the loop 130b may extend continuously from one side of the base portion 130a to another side of the base portion as shown in FIG. 3B, or the loop may have a break or interruption along its length.

As shown in FIG. 3A, in one or more arrangements, loop 130b may be structured to reside within the gap 34 when the tie-down engagement structure 130 is connected to the other portion 32 of the vehicle. This enables the loop 130b to be accessed more easily by the user, when sufficient space exists within the gap 34 for the tie-down engagement structure 130 and opening 32b to be structured so that the loop 130b is positionable within the gap 34, and when the tie-down engagement structure 130 is connected to the other portion 32 of the vehicle. In the embodiment shown in FIG. 3A, the base portion 130a of the tie-down engagement structure 130 may be affixed to the wall 32a as previously described with respect to tie-down engagement structure 30, and the loop 130b extends from a first side 32a-1 of the wall 32a through the opening 32b to a second side 32a-2 of the wall 32a opposite the first side, so that the loop 130b extends into the gap 34 and may be accessed by a user inserting an end of the tie-down member 101 into the gap 34.

In one or other arrangements, and as shown in FIG. 5, the tie-down engagement structure 130 and opening 32b may be structured so that the loop 130b is positioned below the gap 34 when the tie-down engagement structure 130 is connected to the other portion 32 of the vehicle. The loop 130b may be positioned below the gap 34 in cases where insufficient space exists in the gap 34 for the loop to reside within the gap. The loop 130b may be engaged by a tie-down member by inserting a portion of the tie-down member into the gap 34 and below the gap, as shown in FIG. 5.

In one or more arrangements, the tie-down engagement structure is structured and movably connected to the rail structure so as to be engageable by a tie-down member in a location residing within the gap between the cargo bed floor/other portion of the vehicle and the tailgate, as previously described.

In one or more arrangements, the tie-down engagement structure is structured and movably connected to the rail structure so as to be engageable by a tie-down member in a location residing below the gap between the cargo bed floor/other portion of the vehicle and the tailgate, as previously described.

Referring to FIGS. 4A-4D, in one or more arrangements, an embodiment of the tie-down engagement structure may be movably or adjustably connected to the other portion 32 of the vehicle 12. The terms "movably connected" and "adjustably connected" as applied to coupling of the tie-down engagement structure to the other portion of the vehicle is understood to mean that the tie-down engagement structure is connected to the other portion of the vehicle so as to be movable with respect to the other portion of the vehicle along a predetermined path or between a predetermined set of locations. The tie-down engagement structure may then be secured in one of the predetermined locations.

Figure 4A:
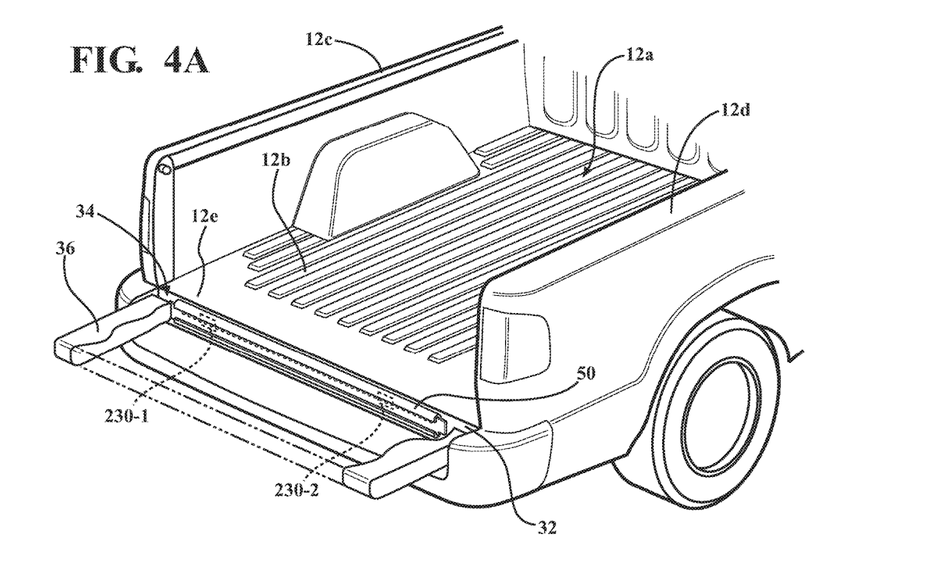
FIG. 4A is a schematic perspective view of a rear portion of a pickup truck with a pair of tie-down engagement structures adjustably or movably connected to the remainder of the truck by a rail structure.
Figure 4B:
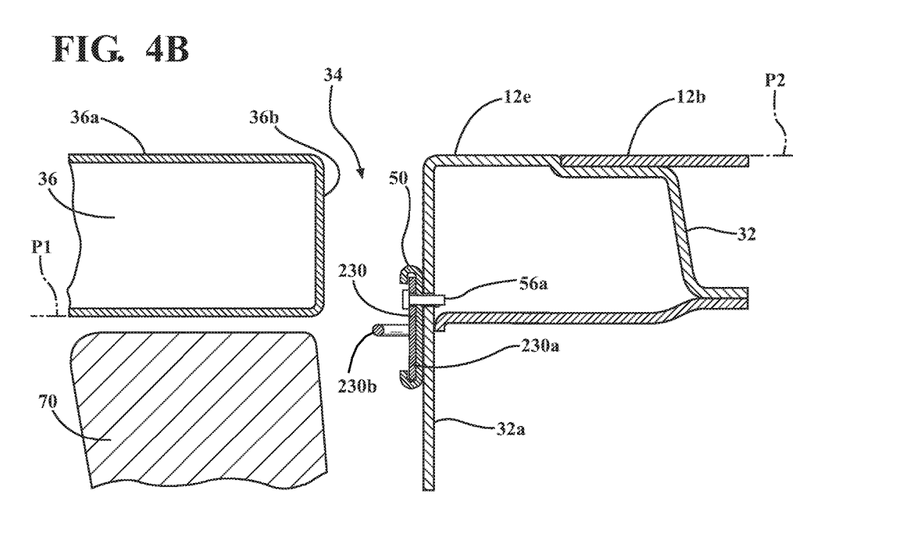
FIG. 4B is a schematic cross-sectional view of a portion of the pickup truck shown in FIG. 4A, showing a gap formed between a rear-most end of the cargo bed and a tailgate when the tailgate is in a lowered configuration, and showing an adjustably positionable tie-down engagement structure mounted on the rail structure, the tie-down engagement structure being structured and positioned so as to be engageable by a tie-down member at a location below the gap.
Figure 4C:
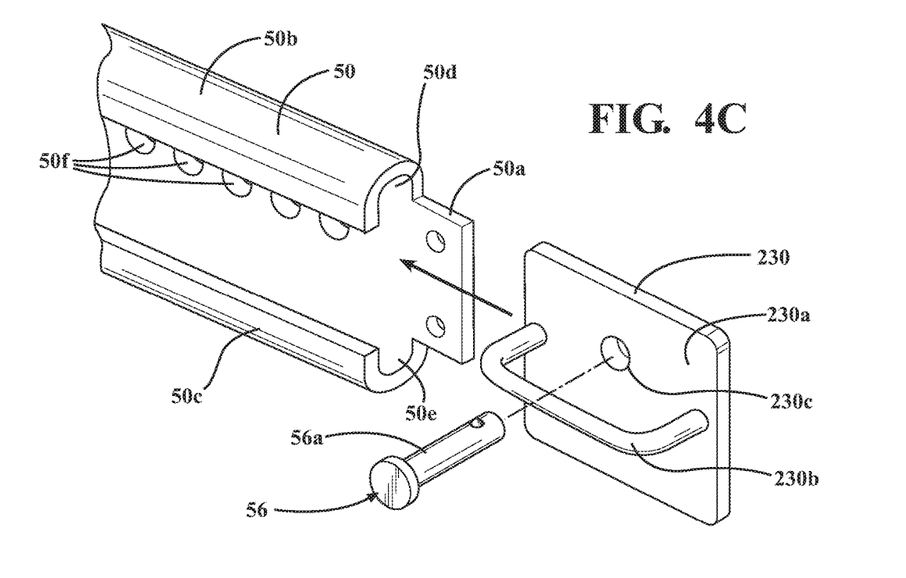
FIG. 4C is a perspective view of a portion of the rail structure and tie-down engagement structure shown in FIGS. 4A and 4B.

For example, referring to FIGS. 4A-4D, in one or more arrangements, the load securement apparatus may further include a rail structure 50 attached to the other portion 32 of the vehicle. The rail structure 50 may be attached to the other portion 32 of the vehicle using any suitable method, for example, welding or bolts. A tie-down engagement structure (such as tie-down engagement structure 230 shown in FIGS. 4A-4D, for example) may be movably connected to the rail structure 50 so as to be movable to, and securable in, positions of a plurality of positions along the rail structure 50. FIG. 4A shows a pair of similar tie-down engagement structures 230-1 and 230-2 movably mounted in the rail structure 50.

Tie-down engagement structure 230 may be similar to tie-down engagement structure 130 previously described. In addition, tie-down engagement structure 230 may include a through hole 230c formed in base portion 230a to enable a locking pin 56a to be inserted into the hole, for locking the tie-down engagement structure in a desired location along the rail structure as described herein.

The rail structure 50 may include a base portion 50a and a pair of opposed flange portions 50b and 50c extending from opposite sides of the base portion 50a. Each of flange portions 50b, 50c may be structured to wrap around so as to overlap a corresponding side of the base portion 50a, thereby forming a corresponding cavity (cavities 50d and 50e) between the flange portion and the base portion. Cavities 50d and 50e are structured to receive associated side edges of a tie-down engagement structure 230 therein, thereby coupling the tie-down engagement structure to the rail structure 50 such that the tie-down engagement structure is movable to, and securable in, various positions along the rail structure 50. Rail structure base portion 50a may have a plurality of collinearly-extending holes 50f formed therealong and sized to receive an end 56a-1 of the locking pin therein.

The tie-down engagement structure 230 may be slid along the rail structure 50 within the cavities 50d, 50e by a user to locate the tie-down engagement structure 230 in a desired location. Then, the tie-down engagement structure 230 may then be secured in the desired location using a locking mechanism (generally designated 56). In one or more arrangements, a locking pin 56a incorporating a spring-loaded detent mechanism 56b as shown in FIG. 4D may be used as a locking mechanism.

Figure 4D:
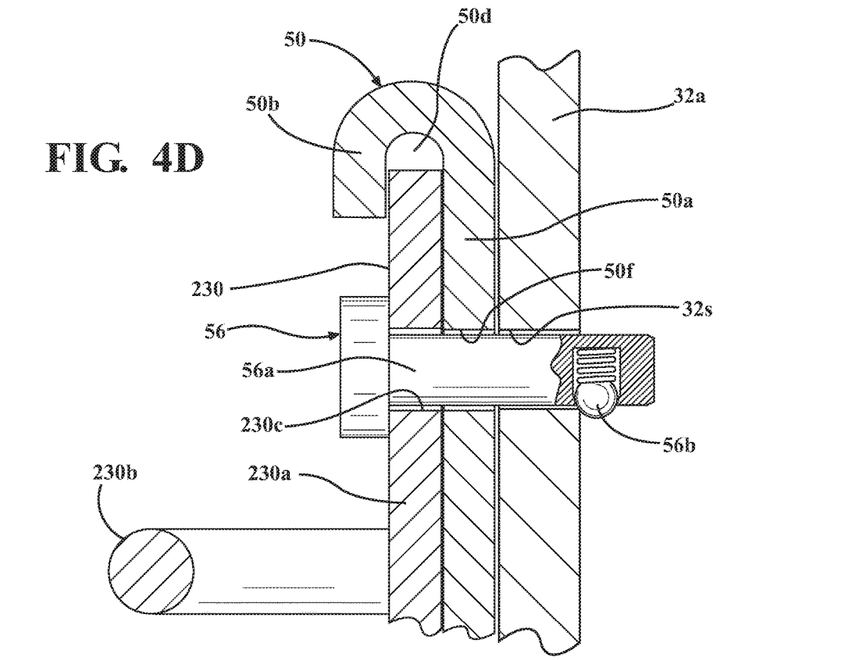
FIG. 4D is a magnified partial cross-sectional view of a tie-down engagement structure mounted in the rail structure of FIGS. 4A-4C, and showing a locking mechanism including a locking pin structured to secure the tie-down engagement structure shown in FIGS. 4A-4C in a desired location along the rail structure.
Figure 5:
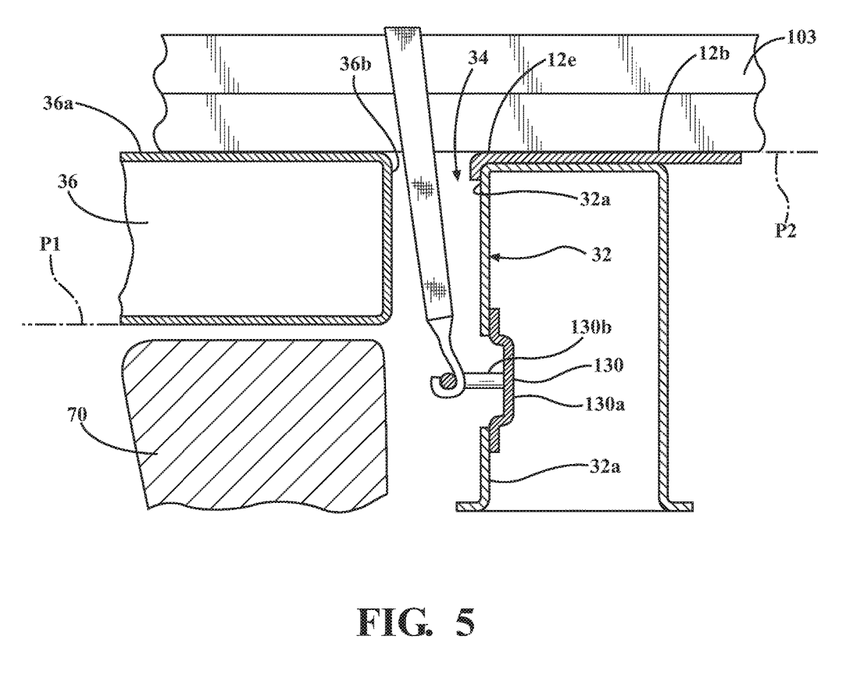
FIG. 5 is a schematic partial cross-sectional view of a portion of the embodiment of the pickup truck shown in FIG. 2 including the tie-down engagement structure of FIG. 3B, showing a gap formed between a rear-most end of the cargo bed and a tailgate when the tailgate is in a lowered configuration, and showing engagement of a tie-down member with the tie-down engagement structure at a location below the gap.

As shown in FIG. 4D, tie down engagement structure 230 may be moved along rail structure 50 until the tie down engagement structure 230 is at a desired location. Hole 230c in tie down engagement structure 230 may then be aligned with one of holes 50f in rail structure 50. A longitudinal slot 32s may be formed in wall 32a behind the rail structure 50 to accommodate insertion of the locking pin 56a at any desired location along the rail structure. A locking pin 56a may then be inserted into the aligned holes 230c and 50f and through slot 32s. When locking pin 56a is inserted into the holes and slot, a spring-loaded ball of the detent mechanism 56b retracts into a hole formed in the pin. When the end of the locking pin 56a projects out of the passage formed by holes 230c and 50f and slot 32s, the ball extends outside the hole to function as a detent impeding withdrawal of the pin from the holes and slot. Pulling of the locking pin 56a may force the ball deeper into the hole in the locking pin 56a, allowing the pin to be extracted. Other forms of locking mechanism may also be used.

The ability to move the tie-down engagement structure to a desired location along the rail and secure the tie-down engagement structure in the desired location enables a load to be secured at any desired location along the gap between the cargo bed floor and the tailgate. For example, the load may be secured along or close to a sidewall of the cargo bed by moving one or more tie-down engagement structure(s) along the rail to positions near the sidewall and locking or securing the tie-down engagement structure(s) in the desired positions.

In accordance with aspects described herein, one or more embodiments of a load securement apparatus for a vehicle incorporating a cargo bed and a tailgate movable between a raised configuration and a lowered configuration to open and close the cargo bed may include at least one tie-down engagement structure connected to another portion of the vehicle. The at least one tie-down engagement structure may be positioned and structured to be engageable by a tie-down member at a location directly opposite the tailgate when the tailgate is in a lowered configuration.

In accordance with aspects described herein, one or more embodiments of a load securement apparatus for a vehicle incorporating a cargo bed and a tailgate movable between a raised configuration and a lowered configuration to open and close the cargo bed may include at least one tie-down engagement structure connected to another portion of the vehicle. The at least one tie-down engagement structure may be positioned and structured to be engageable by a tie-down member at a location below a gap formed between the tailgate and a rear-most portion of a cargo bed of the vehicle when the tailgate is in a lowered configuration.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . ." as used herein refers to and encompasses any and all possible combinations of one or more of the associated listed items. As an example, the phrase "at least one of A, B and C" includes A only, B only, C only, or any combination thereof (e.g. AB, AC, BC or ABC).

In the preceding detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein. Accordingly, reference should be made to the following claims, rather than to the foregoing specification, as indicating the scope of the invention.

What is claimed is:

1. A load securement apparatus for a vehicle incorporating a cargo bed and a tailgate movable between a raised configuration and a lowered configuration to close and open the cargo bed, the load securement apparatus comprising at least one tie-down engagement structure connected to the vehicle and positioned so as to be engageable with a tie-down member by inserting a portion of the tie-down member into a gap formed between an end of the cargo bed and the tailgate after the tailgate has been lowered to the lowered configuration, the load securement apparatus further comprising a rail structure attached to the vehicle, and wherein the at least one tie-down engagement structure is movably connected to the rail structure so as to be movable to, and securable in, a position of a plurality of positions along the rail structure prior to the tie down member being engaged with the at least one tie-down engagement structure.

2. The load securement apparatus of claim 1 wherein the at least one tie-down engagement structure is structured and positioned so as to be engaged by the tie-down member in a location residing below the gap.

3. The load securement apparatus of claim 1 including a plurality of tie-down engagement structures, each tie-down engagement structure of the plurality of tie-down engagement structures being connected to the vehicle in a respective position so as to be engageable with the tie-down member by inserting a portion of the tie-down member into the gap formed between the end of the cargo bed and the tailgate after the tailgate has been lowered to the lowered configuration.

4. The load securement apparatus of claim 1 wherein the at least one tie-down engagement structure is structured and movably connected to the rail structure so as to be engageable by the tie-down member in a location residing below the gap.

5. The load securement apparatus of claim 1 further comprising a plurality of tie-down engagement structures, each tie-down engagement structure of the plurality of tie-down engagement structures being movably connected to the rail structure so as to be movable to, and securable in, a respective position of a plurality of positions along the rail structure prior to the tie down member being engaged with the at least one tie-down engagement structure.

6. The load securement apparatus of claim 1 wherein the rail structure includes a base portion and a pair of opposed flange portions extending from opposite sides of the base portion, and wherein the at least one tie-down engagement structure is received between the flange portions of the pair of opposed flange portions so as to be movable to, and securable in, a position of the plurality of positions along the rail structure.

* * * * *